United States Patent
Giuriati

(10) Patent No.: US 10,121,458 B1
(45) Date of Patent: Nov. 6, 2018

(54) METHOD AND DEVICE FOR FACILITATING LEARNING OF MUSICAL SCALES ON STRING INSTRUMENTS

(71) Applicant: Ivan Giuriati, Sao Pablo (BR)

(72) Inventor: Ivan Giuriati, Sao Pablo (BR)

(*) Notice: Subject to any disclaimer, the term of this patent is extended or adjusted under 35 U.S.C. 154(b) by 0 days.

(21) Appl. No.: 15/671,045

(22) Filed: Aug. 7, 2017

(51) Int. Cl.
*G10G 1/02* (2006.01)
*G09B 15/00* (2006.01)
*G10D 3/10* (2006.01)
*G10D 3/08* (2006.01)

(52) U.S. Cl.
CPC .............. *G10G 1/02* (2013.01); *G09B 15/001* (2013.01); *G10D 3/08* (2013.01); *G10D 3/10* (2013.01)

(58) Field of Classification Search
CPC .................................. G10G 1/02; G09B 15/001
See application file for complete search history.

(56) References Cited

U.S. PATENT DOCUMENTS

| | | | | |
|---|---|---|---|---|
| 765,937 A * | 7/1904 | Reese | ................ | G09B 15/001 84/480 |
| 877,339 A * | 1/1908 | Hobart | ................ | G09B 15/001 84/480 |
| 2,938,421 A * | 5/1960 | Leonard | ................ | G10G 1/00 116/322 |
| 4,807,509 A * | 2/1989 | Graham | ................ | G10D 3/06 84/314 R |
| 4,960,029 A * | 10/1990 | Nelson | ................ | G09B 15/026 235/70 R |
| 4,969,383 A * | 11/1990 | Bezeau, Jr. | ............. | G10G 1/02 84/473 |
| 5,029,507 A * | 7/1991 | Bezeau, Jr. | .......... | G09B 15/003 84/473 |
| 5,107,744 A * | 4/1992 | Bradley | ................ | G09B 15/08 84/480 |
| 5,173,566 A * | 12/1992 | Hiraoka | ............... | G09B 15/001 235/78 R |
| 5,386,757 A * | 2/1995 | Derrick | ............... | G09B 15/008 84/471 SR |
| 5,429,029 A * | 7/1995 | Mendiola, Jr. | ........ | G09B 15/006 84/471 R |
| 5,458,040 A * | 10/1995 | Lawrence, Jr. | ....... | G09B 15/006 84/473 |
| 5,920,023 A * | 7/1999 | Ravagni | ................ | G09B 15/06 84/470 R |
| 5,977,462 A * | 11/1999 | Wolfson | ................ | G10D 3/06 84/267 |
| 7,381,878 B2 * | 6/2008 | Cook | ................ | G09B 15/003 84/314 R |
| 7,408,105 B2 * | 8/2008 | Murdock | ............... | G10G 1/02 84/314 R |

(Continued)

*Primary Examiner* — Robert W Horn

(57) ABSTRACT

A method and device for facilitating learning of musical scales on string instruments are provided. The device comprises a visual scheme consisting of blocks to be positioned just below notes of a scale when fixed on an instrument, each block being formed by the overlap of two rectangles in distinct sizes, which serve as space for accommodation of different didactic information; a manual providing information for the understanding and proper use of the visual scheme; and a musical background providing tracks that sound in the same frequency or tonality of the visual scheme. The device can further include a complementary visual scheme useful in practicing scales in different tonalities.

20 Claims, 5 Drawing Sheets

(56) References Cited

U.S. PATENT DOCUMENTS

| | | | | |
|---|---|---|---|---|
| 8,399,756 B1* | 3/2013 | Trent | ............... | G10D 3/06 84/314 R |
| 8,772,616 B1* | 7/2014 | Jennings | ............... | G10D 3/06 84/293 |
| 2008/0121087 A1* | 5/2008 | Rees | ............... | G09B 15/001 84/314 R |
| 2010/0122621 A1* | 5/2010 | Newstetter | ............... | G10G 1/02 84/314 R |
| 2012/0285314 A1* | 11/2012 | Kellner | ............... | G09B 15/026 84/485 R |
| 2014/0116232 A1* | 5/2014 | Cyr | ............... | G10G 1/02 84/485 R |
| 2015/0356958 A1* | 12/2015 | Brenna | ............... | G10G 1/02 84/483.2 |

* cited by examiner

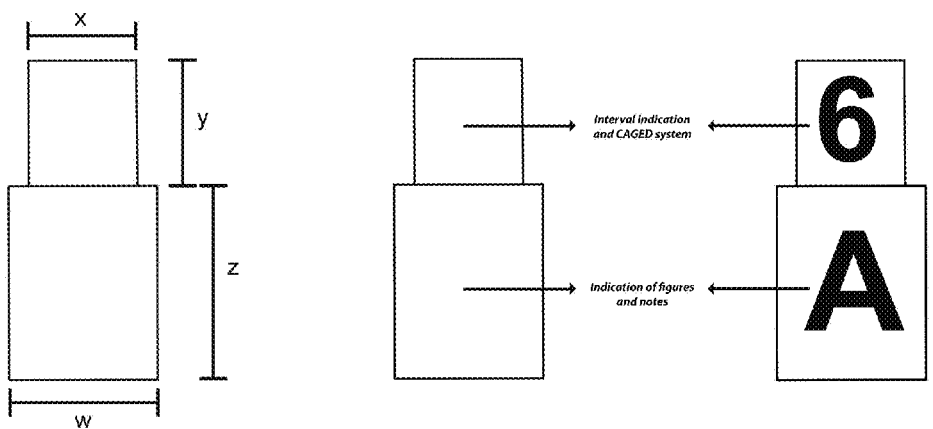
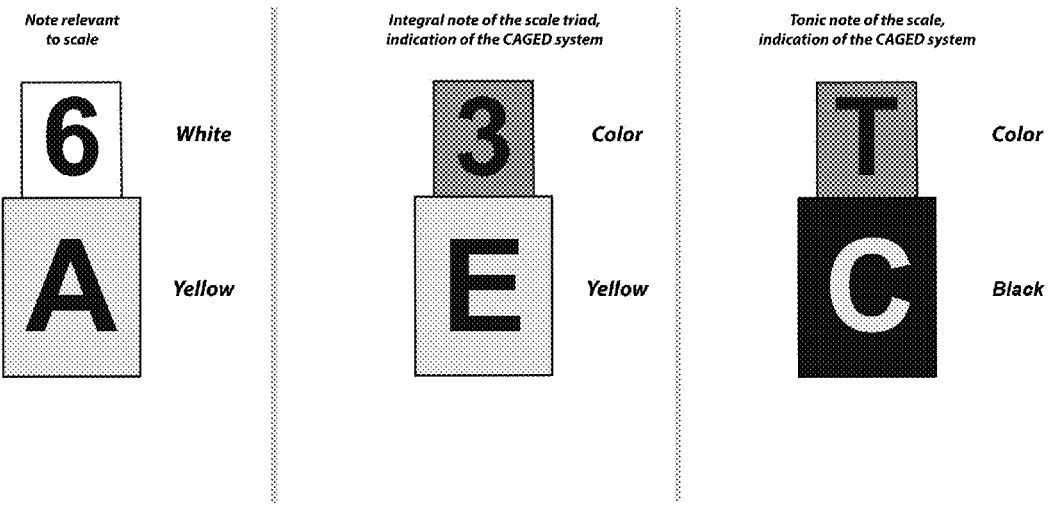

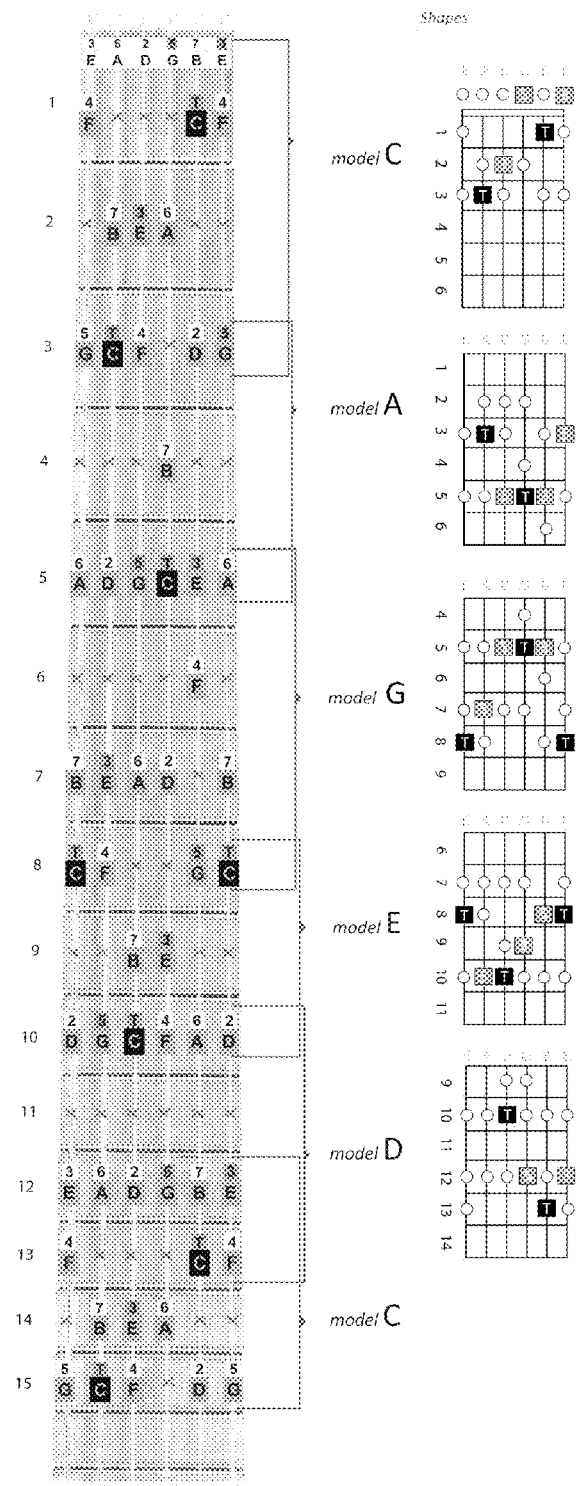
Fig 3  5 typing patterns corresponding to the 5 basic chords in the CAGED system

Fig 4 Basic structure
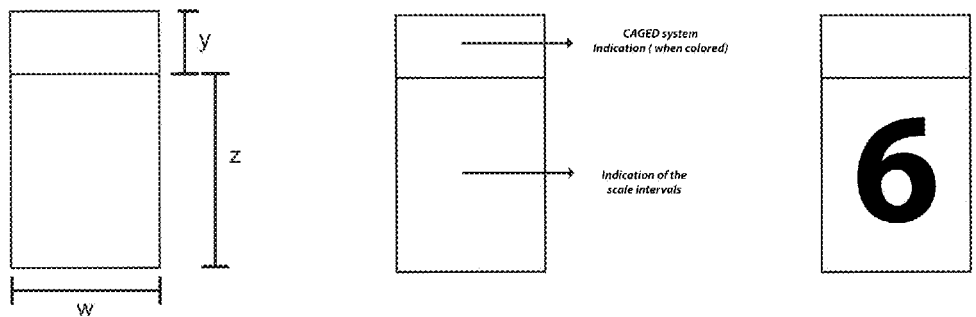
Fig 5 Indications and colorings (example diatonic scale)
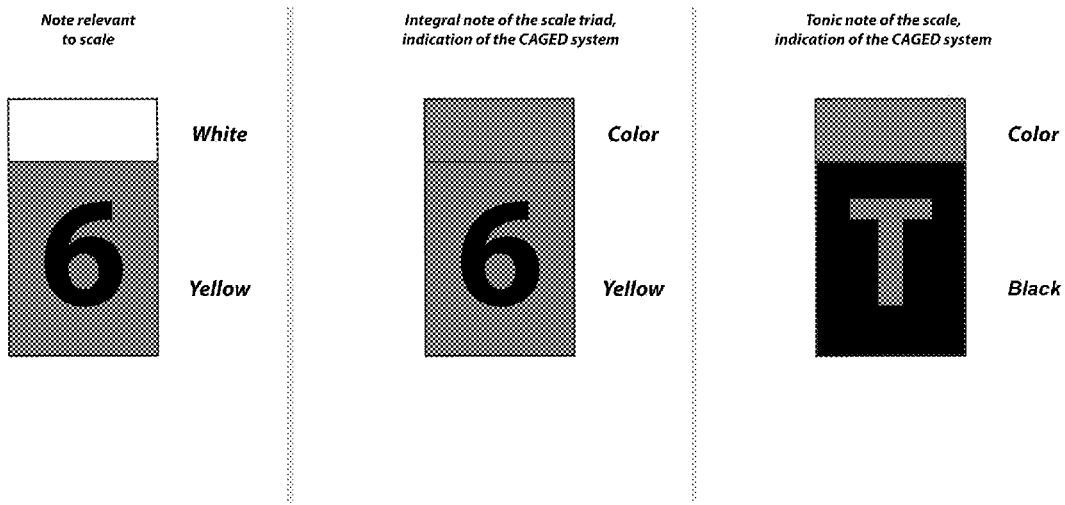

Fig 6     Pratice the scales in another tone (key), complementary visual scheme.
1) First step
Find the note you desire
on the fretboard
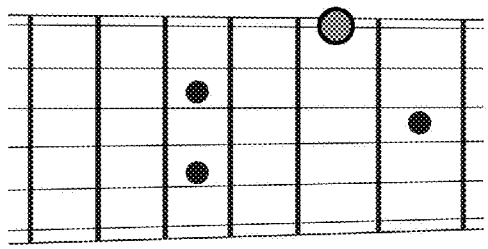
2) Second step
Find a Tonic note that matches
with the selected note
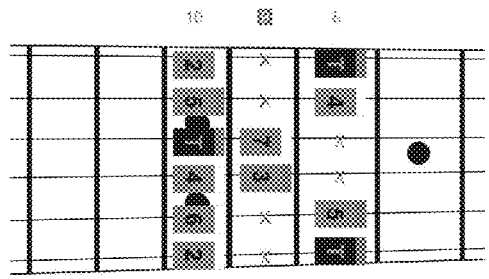
3) Third step
Keep following the sequence until arrives at the 12th fret them turn again to the first fret kepping the sequence as seen below:
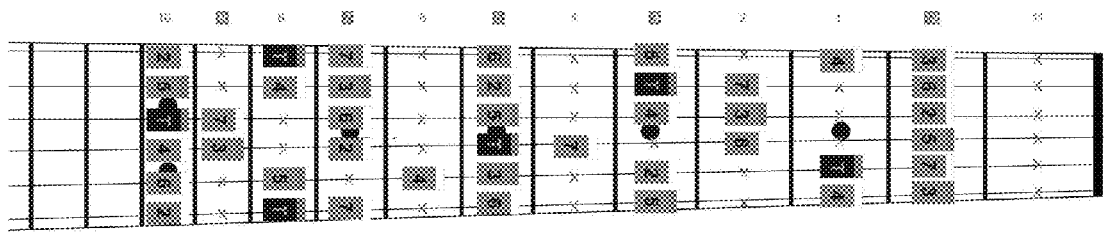

Fig 7

Step 1: With the folded carton, highlight the stickers (both sides) on the dotted line, as shown below:

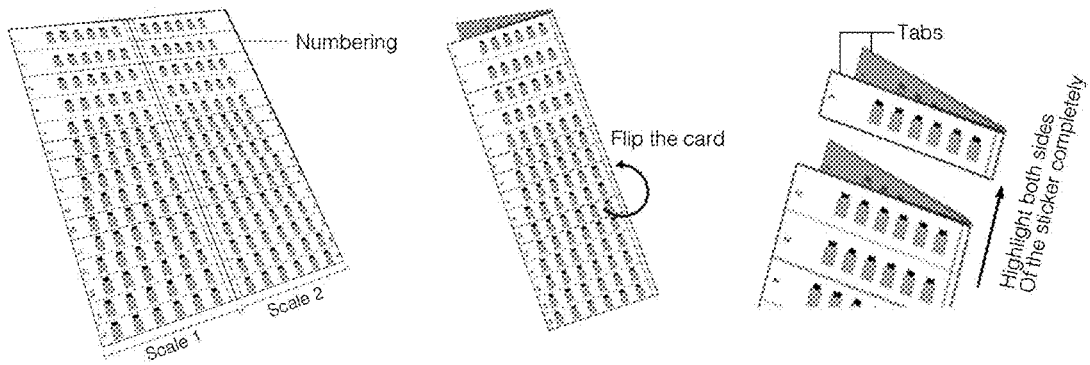

Step 2: Still with the adhesive attached to the liner (white paper under the vinyl sticker), insert the sticker still folded in the corresponding box underneath the strings, always from top to bottom.

Step 3: Slightly rotate the flaps to loosen the tip of the sticker (bottom edge).

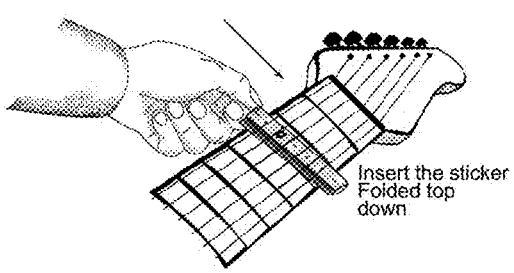

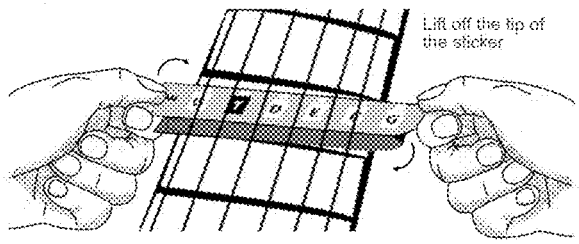

Step 4: Attach the tip of the adhesive to the lower end of the instrument, or grasp it, and pull the lower flap completely.

Step 5: Reposition and align the sticker notes below the strings and attach the adhesive tabs on the instrument arm.

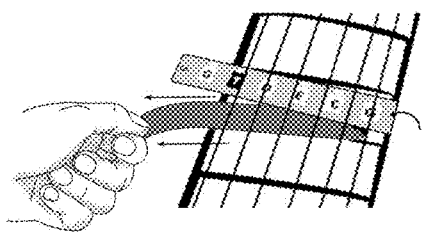

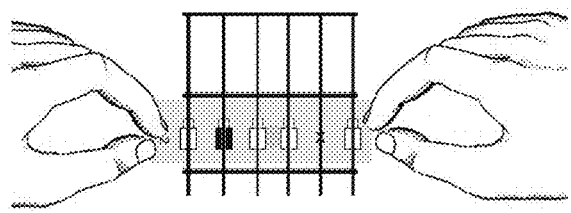

METHOD AND DEVICE FOR FACILITATING LEARNING OF MUSICAL SCALES ON STRING INSTRUMENTS

FIELD OF THE INVENTION

The present invention relates generally to music and instrument learning aids, and more particularly, to a method and device for facilitating learning of musical scales on string instruments.

BACKGROUND OF THE INVENTION

Learning a string instrument involves, summarily and objectively, two didactic steps: 1) learning musical theory concepts, and 2) applying such concepts on the instrument itself. Teaching methods should, therefore, be intended for these two stages. While there are a number of books, CDs and other didactic material that praise the theoretical part, there are others that lend themselves to the application of these concepts in the instruments themselves (practical part).

A didactic methodology is intended to provide knowledge in the second stage of learning, or better, aid in the transformation of theoretical concepts into practical knowledge according to the physical configurations of each type of instrument.

In this sense, it is worth mentioning that there are a number of inventions or devices that are also intended to fix, for example, didactic information directly on the arm of the instruments, promoting a visual stimulation of such information. However, all such existing inventions, as in the case of the US Patent 20120167746 A1, were intended mainly to solve the existence of a physical device that made it possible to fix information on string instruments, with little thought towards the caring or innovating with the consistency of a didactic methodology itself.

Such existing mechanisms inform only the location of notes on instruments (notes map) or the location of the notes in a certain scale, without any other indications that provide the understanding of such concepts, or that establish a clear relationship between theory and practice in the sense to create a true knowledge, or a skill that will remain even after the removal of such resources.

Displaying graphically a note or a set of notes on the arm of an instrument without any elements that refer to its theory, does not contribute to the didactic and pedagogical path expected for the study and knowledge of the scales. These are only useful in the hands of a musician who already knows the fundamentals of the theory. A student of music must know, except for rare individuals of innate musical ability, the theoretical aspects of a note or a set of notes, such as its interval formula and the geometrical distances of each type of interval, its sonic aspects, and its infinite ways of performing the digits (touching the scale). It is only by training in these two theoretical and practical ways that the student will be able to perform it, for example, in any musical tone.

An apparatus which designates the notes of a scale so that they are stamped directly on the arm of an instrument without assuring it of favoring its theoretical training together may, from a certain point of view, end up prejudicing the advisable didactic path pedagogically. As the notes of a scale are made explicit, it will inevitably contribute to the non-stimulation of the student in the didactic sense of "counting" the scale. In other words, the student can easily become "addicted" to the convenience of the tip and dedicate his efforts only in its external aspects (typing), not enabling, for example, to perform the same patterns of typing in another key.

In this case, most likely the student will not be able to do the same as soon as he or she is no longer using the stickers on the instrument, since it is very difficult, and even inadvisable, for a person to memorize a scale over the instrument without any references of the rules of its formula and the specific distances generated by its intervals from a tonic (origin note).

The devices that visually display notes on instruments, as mentioned above, already exist, but a true visual method of music teaching, capable of providing a practical and consistent musical knowledge about the musical scales and their interval structures, which remains even after the removal of such resources, is absent.

With the advancement of technology and the existence of various adhesive substrates available on the market, the existing patented apparatuses become obsolete providing just a function that a single common adhesive provides. They have been concerned only with the apparatus and not with the content. This does not detract from the importance of such inventions, but makes it very limited to a purpose or consistency required by a true method. Moreover, with simple techniques of application or manipulation of a sticker, any type of adhesive label can be easily applied on an instrument without having to remove the strings for a perfect installation.

Nevertheless, it is worth noting the existence, in parallel with the invention in question, of various adhesive labels (common adhesives) with didactic information to be applied directly to the instruments, since the inclusion of visual cues in any type of learning is an obvious idea, and especially useful on the subject of teaching music on instruments. However, for the same reasons already presented, they did nothing to concretize a method that is truly pedagogical and teaching of the scales. These stickers only explain the location of notes without any call or indication of a valid and consistent path behavior of the scales and their intervals, which would really matter and would validate for the existence of a true sticker-based visual method.

Accordingly, there is an established need for a visual teaching method of the musical scales on instruments, which is truly pedagogical.

SUMMARY OF THE INVENTION

The present invention is directed to a visual teaching method of the musical scales on string instruments. The method consists mainly of strategic visual schemes formulated from theoretical musical concepts that stimulate the creation of an organized and practical visual memory of the geometric behavior presented on the scales and also their interval structures on the instrument arm. The method includes and combines such visual schemes on adhesive substrates (to be applied directly on the instruments), graphic manuals and musical backgrounds (cd) that, added to their complementary purposes and contained in a single pack, becomes an unprecedented and exclusive teaching material to study and understand the musical scales.

Specifically, the present invention provides a method for the study of the scales and the geometric dispositions assumed by the various types of intervals, which has as its object and function to stimulate the visual memory through strategic diagrams, printed on adhesive substrates and applied directly to the arm of the instruments. Such adhesive graphic schemes are accompanied by exclusive pocket guides that guide the student to the correct didactic use of the adhesives, containing specific information about scales, both from a theoretical point of view and from their practical and conventional typefaces—from what intervals are, how they form in the instrument, the formula of the respective scales, their applications on chords, among many other aspects, to which finger the learner should start typing in each region.

The scale manual included and specific to each pack (unit of didactic module) is of extreme importance so that the visual schemes fulfill their objective. From another point of view, it is a complementary theoretical material developed to increase the quality of observations or understandings obtained visually, enabling the student to better understand the dispositions presented and to ensure an effective use of the suggested visual schemes.

Other material that complements and guarantees consistency in the present methodology is the musical backgrounds developed for each type of scale. Through tracks that sound in the same frequency or tonality of the didactic schemes provided in each pack, never changing tonality or evidencing chord variations, as is common in any song, it allows the student to easily train the digits in harmony through the musical backgrounds, bringing the student closer to the studies. In addition to the incentive of pedagogical value, it also trains the student in a fun way for one of the main practical functions of the scales—solo or improvisation music.

Given the three elements that, with great effectiveness, complement one another and give consistency to an unprecedented method for the practical study of the scales, it is therefore worth noting that the methodology is complete, contemplating all the main scales (pentatonic, diatonic, minor harmonic and minor melodic) and adapted to each type of instrument—from the sizes of the schemes printed on self-adhesive material, the graphical illustrations in the manuals to the compositions of the musical backgrounds, and all customized for each type of instrument and scale.

The studying methodology of the scales, therefore, consists of 4 distinct modules—one for each type of scale. As the scales are musical subjects that require a gradual study and following a certain logical order for a consistent learning of each type, the student who is studying or wanting to learn about the pentatonic scale, for example, can only use fully the module related to this scale, and so on. Following the modules reveals, therefore, its other versatile and modern aspect of the present methodology.

Such characteristics of composition, such as the combination of these three distinct and specific elements for each didactic module, and adopted formulations leave no doubt about the quality and consistency of the method in question. More than simple didactic devices, this is a true complete methodology in attributes needed to obtain the results indicated—a familiarization with the scales typing and the geometric dispositions assumed by each type of interval, among several other benefits.

Introducing a first embodiment of the invention, the present invention consists of a device for facilitating learning of musical scales on string instruments, comprising:

a visual scheme consisting of blocks to be positioned just below notes of a scale when fixed on an instrument, each block being formed by the overlap of two rectangles in distinct sizes, which serve as space for accommodation of different didactic information;

a manual providing information for the understanding and proper use of the visual scheme; and a musical background providing tracks that sound in the same frequency or tonality of the visual scheme.

In another aspect, the two rectangles include a lower major rectangle indicating a cipher of a note and an upper smaller rectangle indicating an interval of the note.

In another aspect, the lower major rectangle has a width and a height larger than a width and a height of the upper smaller rectangle respectively.

In another aspect, the two rectangles have contrast color patterns.

In another aspect, the lower major rectangle has a black and yellow color pattern while the upper smaller rectangle has a green and white color pattern.

In another aspect, the upper smaller rectangles of the blocks receive differential staining for notes integral to a tonic scale triad and notes not integral to the tonic scale triad.

In another aspect, the upper smaller rectangles of the blocks for notes integral to the tonic scale triad receive a staining of green while the upper smaller rectangles of the blocks for notes not integral to the tonic scale triad receive a staining of white.

In another aspect, the device further comprises:

a complementary visual scheme consisting of blocks to be positioned just below notes of a scale when fixed on an instrument, each block being formed by the overlap of two rectangles in distinct sizes, which serve as space for accommodation of different didactic information.

In another aspect, the two rectangles include a lower major rectangle indicating an interval of a note and an upper smaller rectangle indicating CAGED system information of the note.

In another aspect, the lower major rectangle of each complementary visual scheme block has a width the same as a width of the upper smaller rectangle and a height larger than a height of the upper smaller rectangle.

In another aspect, the two rectangles of each complementary visual scheme block have contrast color patterns.

In another aspect, the lower major rectangle of each complementary visual scheme has a black and yellow color pattern while the upper smaller rectangle has a green and white color pattern.

In another aspect, the upper smaller rectangles of the complementary visual scheme blocks receive differential staining for notes integral to a tonic scale triad and notes not integral to the tonic scale triad.

In another aspect, the upper smaller rectangles of the complementary visual scheme blocks for notes integral to the tonic scale triad receive a staining of green while the upper smaller rectangles of the blocks for notes not integral to the tonic scale triad receive a staining of white.

In another aspect, the complementary visual scheme is useful in practicing scales in different tonalities.

Introducing a second embodiment of the invention, the present invention consists of a method for facilitating learning of musical scales on string instruments, comprising:

providing a visual scheme consisting of blocks to be positioned just below notes of a scale when fixed on an instrument, each block being formed by the overlap of two rectangles in distinct sizes, which serve as space for accommodation of different didactic information;

providing a manual containing information for the understanding and proper use of the visual scheme; and providing a musical background containing tracks that sound in the same frequency or tonality of the visual scheme.

In another aspect, the two rectangles include a lower major rectangle indicating a cipher of a note and an upper smaller rectangle indicating an interval of the note, the lower major rectangle has a width and a height larger than a width and a height of the upper smaller rectangle respectively, the two rectangles have contrast color patterns, the lower major rectangle has a black and yellow color pattern while the upper smaller rectangle having a green and white color pattern, the upper smaller rectangles of the blocks receive differential staining for notes integral to a tonic scale triad and notes not integral to the tonic scale triad, the upper smaller rectangles of the blocks for notes integral to the tonic scale triad receive a staining of green while the upper smaller rectangles of the blocks for notes not integral to the tonic scale triad receive a staining of white.

In another aspect, the method of further comprises:

providing a complementary visual scheme consisting of blocks to be positioned just below notes of a scale when fixed on an instrument, each block being formed by the overlap of two rectangles in distinct sizes, which serve as space for accommodation of different didactic information.

In another aspect, the two rectangles of each complementary visual scheme block include a lower major rectangle indicating an interval of a note and an upper smaller rectangle indicating CAGED system information of the note, the lower major rectangle has a width the same as a width of the upper smaller rectangle and a height larger than a height of the upper smaller rectangle, the two rectangles have contrast color patterns, the lower major rectangle has a black and yellow color pattern while the upper smaller rectangle has a green and white color pattern, the upper smaller rectangles of the blocks receive differential staining for notes integral to a tonic scale triad and notes not integral to the tonic scale triad, the upper smaller rectangles of the blocks for notes integral to the tonic scale triad receive a staining of green while the upper smaller rectangles of the blocks for notes not integral to the tonic scale triad receive a staining of white, the complementary visual scheme is useful in practicing scales in different tonalities.

Introducing a first embodiment of the invention, the present invention consists of a method of installing adhesive labels printed thereon a visual scheme onto an instrument, comprising:

printing the visual scheme on adhesive labels in the form of a foldable carton;

folding the foldable carton;

separating from the folded carton a unit suitable to be installed to a space between two metal filaments on the instrument, but in folded size;

introducing the unit into the space underneath strings while adhesive still attached to an adhesive substrate;

rotating sides to detach the adhesive substrate;

repositioning and aligning the unit of adhesive labels underneath the strings; and attaching the adhesive labels on instrument arm in the space.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 1 presents a schematic view illustrating the basic structure of an exemplary box of the visual scheme according to the present invention;

FIG. 2 presents a schematic view of 3 different types of boxes with different indications and coloring, each box having the basic structure as shown in FIG. 1;

FIG. 3 presents a schematic view illustrating 5 typing patterns corresponding to the 5 basic chords in the CAGED system using the visual scheme boxes shown in FIGS. 1 and 2;

FIG. 4 presents a schematic view illustrating the basic structure of an exemplary box of the complementary visual scheme according to the present invention;

FIG. 5 presents a schematic view of 3 different types of boxes with different indications and coloring, each box having the basic structure as shown in FIG. 4;

FIG. 6 presents a schematic view illustrating the application of the complementary visual scheme shown in FIGS. 4 and 5 in practicing the scales in another tone; and FIG. 7 presents a schematic view illustrating a sticker application procedure according to the present invention.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a unique visual teaching method and device of musical scales on string instruments.

The present methodology is based on the scale learning and the dispositions assumed by each type of interval through strategic graphical schemes that induce a pedagogical comprehension and familiarization of the subjects addressed. Such graphic schemes are printed on adhesive substrates and oriented to be attached directly to the instrument arm. The methodology, in general, is embodied by complementary manuals that provide an ideal theoretical knowledge for the understanding of the graphic schemes and the behavior of the scales, as well as musical backgrounds that facilitate and prove the learner's advances in the handling of the scales.

Referring now to FIGS. 1 and 2, the graphic schemes consist of blocks 100 positioned just below the integral note of the scale when fixed on the instruments. Each block 100, in turn, is formed by the overlap of rectangles 120, 140 in distinct sizes (for example, the lower rectangle 120 has a width w and height z larger than the width x and height y of the upper rectangle 140 respectively), which serve as space for accommodation of different didactic information. While the lower major rectangle 120 indicates the cipher of the note to which space refers, the upper smaller rectangle 140 indicates its quality or degree that exerts on that scale.

The strategy used to differentiate the sizes of these rectangles, besides harmonizing and facilitating the reading of two information in the same small space, is essential for discerning the type of information that is being explained. In this sense, in addition to different sizes, also the color patterns of the rectangles are contrasted (for example, black/yellow vs. green or white as shown in FIGS. 2-3) to highlight and make an easy reading and organization.

While the student fixes his or her observation on the note-stickers graphic schemes, it is possible, for example, to perform the typing while studying the interval structure. Visual stimulation in this sense promotes a quick and consistent familiarization of distances between intervals and the scale formula. Such knowledge, important to note, is essential in any subject of music, whether in compositions, chord constructions, melodies, and so on.

Another strategy applied in the present methodology is differential staining in key scale notes. With regard to the presentation and organization of didactic information, it is not new in some existing devices, which are also intended to fix information on instruments, to find the distinction of the tonic note of the scales (starting point). However, this, in isolation and without any didactic complementation, does little to contribute to a consistent teaching method of the scales. There is a need to go further.

The present method, besides connecting the scales and positioning on each note its interval function, with intuitive formats that facilitate the distinction and reading of the different types of information, is still structured in the supply of many other visual strategies.

The upper smaller rectangles 140, which indicate the interval function of each scale note, receive differential staining at three strategic intervals: tonic, third and fifth (for example, green color for the tonic note and any integral note of the tonic scale triad while white color for a note relevant to the scale, but not integral to the scale tonal triad as shown in FIGS. 2-3). The purpose of this combination is to evidence the chord (triad) that forms from the first degree of the scale. The reason to highlight the triad formed in the first degree is that in the case of a pedagogical function oriented to the knowledge and study of a certain scale's first degree, the degree that gives rise to the scale is, undoubtedly, the most important starting point for the study.

The practical use of this differential coloring is that, once such intervals are exalted, the formation of a cycle of 5 types of chords is observed in the same cyclic sequence throughout the instrument. In this way, it is possible to use this conclusion for several didactic purposes. In the study of the learning the scales, the didactic way to go under this conclusion is to associate each type of chord with a typing format (FIG. 3), thus resulting in 5 different typing patterns—a chord format for each typing pattern.

The didactic importance of this knowledge or association ability proves to be extremely useful for the execution of a scale when it is required on another key. Nothing is more obvious or natural in the study of music than for the student to begin the study of the scales taking as base the two familiar notes (tone): C for larger scales and C minor, and to only afterwards, after knowing the scale about its various aspects, learn other notes and locations on the instrument arm. It's the natural way!

In this sense, having strategic references for the scaling of the scales, such as knowing the cycle of chord formation generated in the first degree (tonic), and associating them with the respective typing patterns are undoubtedly excellent strategies of "visualizing" or understanding the scales whenever a scale is required on a particular key. It is sufficient for a learner to locate the note that gives rise to this scale, to identify the chord format that originates in the region of the note and to associate it with the respective keystroke. It is thus easy to establish the neighboring digits, knowing that the cycle or sequence of chord formation will always be the same.

Through the visual schemes proposed, a learner can strategically visualize all this musical logic and familiarize him or herself with important musical concepts in a practical way, using only the visual stimulus. This provides an unprecedented and comfortable way of studying music without requiring too much concentration or mental effort to assimilate a complex context into geometric information and dispositions. It is undoubtedly a very effective method.

In order for the visual schemas to become clear and profitable to a learner, it is, therefore, now easy to understand the purpose of the manual that accompanies each didactic module. The manual contains all sorts of theoretical orientation on the scales and, mainly, a complete visual orientation of how to interpret their formation, an analysis of the association of each typing pattern with a certain chord format, including from which finger starts each of the digits. All so that the adhesive visual schemes can be studied fully, effectively and that the results remain even after removal of the sticker.

In this sense, in order to be sure of a complete practical knowledge of the behavior and dispositions assumed by each type of scale on the arm of the instrument, there is still, in the present methodology, another visual scheme complementary to the first one. The complementary visual scheme, without mentioning which notes are being used in the formation of a certain scale, only mentions the interval structure of the note with the aforementioned markings in the strategic intervals of tonic, third and fifth, which evidence the formation of the cycle of 5 chords to the instrument (FIG. 6).

As shown in FIGS. 4-6, the complementary visual scheme consists of boxes 400, each of which, in turn, is formed by the overlap of rectangles 420, 440 in distinct sizes (for example, the lower rectangle 420 has a height z larger than the height y of the upper rectangle 440 respectively, while both rectangles have the same width w), which serve as space for accommodation of different didactic information. While the lower major rectangle 420 indicates the interval of the note, the upper smaller rectangle 440 provides CAGED system indication when colored.

The benefit of the complementary visual scheme is that from this scheme, precisely because it contemplates only an interval formula with strategic markings, the student can apply it on other tonalities in the instrument, solidifying its understanding on the formation of scales in any region or tonality, as well as its formula structural (intervals). Namely, since the interval patterns of a given scale will always be the same, as well as the distances between each degree of its formula, it will suffice, therefore, to transpose such geometries to other locations to change the tonality of a scale. This concept of geometrical transposition of patterns thus becomes clear and solidifies while a learner can train a scale in question on any other starting point or tonality.

This is, therefore, an unprecedented and consistent methodology capable of promoting valuable musical knowledge through strategic visual stimulation. Never before had been presented to a student a methodology that compelled the student to such results through this specific didactic path elaborated.

Since it is a method based on visual didactic schemes that must be applied directly to musical instruments, it is necessary to have them printed on sticky materials in order to achieve their goal. On the other hand, it is worth mentioning that they are independent of their quality so that the pedagogical results can be made available to students.

The methodology does not innovate, therefore, about the physical or chemical qualities of a device to be coupled or installed on the arm of an instrument, as done by other inventors, but innovates in the way of working and organizing theoretical information through visual schemas to be, in any way, on the instrument arm.

In any case, because of the physical constitution of the instruments, their limitations and dimensions, the didactic schemes assume predictable and obvious formats. As they are fixed below the strings, straight on the arm of the instrument, and since the arm of the instruments covered is totally divided by metallic filaments called frets, which prevent or section the continuity of the arm surface, it is necessary, therefore, that they are divided into individual rectangular units to fulfill this function. The same reasoning used in the manufacture of stickers with didactic instructions available in the market.

On the other hand, with the exception of devices manufactured and created precisely to be applied under the strings without major inconveniences, all other stickers with didactic information present in the market find a difficulty that mitigates the convenience of such devices. Being fabricated from the printing on adhesive vinylic materials, available in the market for a wide and general purpose, such substrates are soft or very flexible. Thus, as soon as they are inserted underneath the strings, and there being no physical space for a correct handling, they cannot slide down the arm of the instrument and fix themselves at the beginning or the middle of the necessary way to go. This, therefore, results in several drawbacks. For example, unless the strings are removed for a correct installation, a series of attempts will be necessary to install the adhesive material, in which case there is a need for constant contact with the adhesive, which would decrease its attachment capacity, or there will be a need to use extra features such as wooden or plastic sticks, for example, to aid in this installation process.

The present methodology also innovates in this installation process, using the same generic adhesive materials that do not have any ingredients in its formula prioritized for this purpose. By making the carton in strategic formats, it is possible to perfectly apply the adhesive labels without any of the drawbacks presented. FIG. 7 illustrates an exemplary sticker application procedure 700 according to the present invention. As shown in FIG. 7, highlighting each unit relative to a house in the instrument (space between the metal filaments) but in folded size (FIG. 7, step 1 710), it is therefore sufficient to introduce the unit while the adhesive is still attached to the liner (FIG. 7, step 2 720) and rotate the sides to detach the adhesive substrate (FIG. 7, steps 3 730 and step 4 740) and thus make possible a correct installation and alignment of the visual schemes just below the chords (FIG. 7, step 5 750)

Such combinations, therefore, demonstrate that the present method is a consistent pedagogical solution, innovative and able to leverage the studies of music in string instruments. And as such, specific to the study of musical ranges, they can be included or worked together with any other traditional methodology. Another aspect that demonstrates the incredible versatility or applicability of the present invention's proposal.

Finally, it is worth noting that the generic idea of the application of adhesive labels with didactic information on the instrument arm is not sought, but rather the didactic paths, associations and visual solutions offered in the present methodology—from the visual harmonization of the formats used for the creation of didactic associations, to the combinations of the theoretical elements explained in the visual schemas.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A device for facilitating learning of musical scales on string instruments, comprising:
    a visual scheme printed on a substrate consisting of blocks to be positioned just below notes of a scale when fixed on an instrument, each block being formed by the overlap of two rectangles in distinct sizes and color patterns, which serve as space for accommodation of different didactic information including a cipher of a note and quality or degree of the note;
    a manual providing information for the understanding and proper use of the visual scheme; and
    a musical background providing tracks that sound in the same frequency or tonality of the visual scheme.

2. The device of claim 1, wherein the two rectangles include a lower major rectangle indicating a cipher of a note and an upper smaller rectangle indicating an interval of the note.

3. The device of claim 2, wherein the lower major rectangle has a width and a height larger than a width and a height of the upper smaller rectangle respectively.

4. The device of claim 2, wherein the two rectangles have contrast color patterns.

5. The device of claim 4, wherein the lower major rectangle has a black and yellow color pattern while the upper smaller rectangle has a green and white color pattern.

6. The device of claim 2, wherein the upper smaller rectangles of the blocks receive differential staining for notes integral to a tonic scale triad and notes not integral to the tonic scale triad.

7. The device of claim 6, wherein the upper smaller rectangles of the blocks for notes integral to the tonic scale triad receive a staining of green while the upper smaller rectangles of the blocks for notes not integral to the tonic scale triad receive a staining of white.

8. The device of claim 1, further comprising:
    a complementary visual scheme printed on a substrate consisting of blocks to be positioned just below notes of a scale when fixed on an instrument, each block being formed by the overlap of two rectangles in distinct sizes and color patterns, which serve as space for accommodation of different didactic information including an interval of a note and CAGED system information of the note.

9. The device of claim 8, wherein the two rectangles include a lower major rectangle indicating an interval of a note and an upper smaller rectangle indicating CAGED system information of the note.

10. The device of claim 9, wherein the lower major rectangle has a width the same as a width of the upper smaller rectangle and a height larger than a height of the upper smaller rectangle.

11. The device of claim 9, wherein the two rectangles have contrast color patterns.

12. The device of claim 11, wherein the lower major rectangle has a black and yellow color pattern while the upper smaller rectangle has a green and white color pattern.

13. The device of claim 7, wherein the upper smaller rectangles of the blocks receive differential staining for notes integral to a tonic scale triad and notes not integral to the tonic scale triad.

14. The device of claim 13, wherein the upper smaller rectangles of the blocks for notes integral to the tonic scale triad receive a staining of green while the upper smaller rectangles of the blocks for notes not integral to the tonic scale triad receive a staining of white.

15. The device of claim 8, wherein the complementary visual scheme is configured to be used in practicing scales in different tonalities.

16. A method for facilitating learning of musical scales on string instruments, comprising:
providing a visual scheme printed on a substrate consisting of blocks to be positioned just below notes of a scale when fixed on an instrument, each block being formed by the overlap of two rectangles in distinct sizes and color patterns, which serve as space for accommodation of different didactic information including a cipher of a note and quality or degree of the note;
providing a manual containing information for the understanding and proper use of the visual scheme; and
providing a musical background containing tracks that sound in the same frequency or tonality of the visual scheme.

17. The method of claim 16, wherein the two rectangles include a lower major rectangle indicating a cipher of a note and an upper smaller rectangle indicating an interval of the note, the lower major rectangle has a width and a height larger than a width and a height of the upper smaller rectangle respectively, the two rectangles have contrast color patterns, the lower major rectangle has a black and yellow color pattern while the upper smaller rectangle having a green and white color pattern, the upper smaller rectangles of the blocks receive differential staining for notes integral to a tonic scale triad and notes not integral to the tonic scale triad, the upper smaller rectangles of the blocks for notes integral to the tonic scale triad receive a staining of green while the upper smaller rectangles of the blocks for notes not integral to the tonic scale triad receive a staining of white.

18. The method of claim 16, further comprising:
providing a complementary visual scheme printed on a substrate consisting of blocks to be positioned just below notes of a scale when fixed on an instrument, each block being formed by the overlap of two rectangles in distinct sizes and color patterns, which serve as space for accommodation of different didactic information including an interval of a note and CAGED system information of the note.

19. The method of claim 18, wherein the two rectangles of each complementary visual scheme block include a lower major rectangle indicating an interval of a note and an upper smaller rectangle indicating CAGED system information of the note, the lower major rectangle has a height larger than a height of the upper smaller rectangle, the two rectangles have contrast color patterns, the lower major rectangle has a black and yellow color pattern while the upper smaller rectangle has a green and white color pattern, the upper smaller rectangles of the blocks receive differential staining for notes integral to a tonic scale triad and notes not integral to the tonic scale triad, the upper smaller rectangles of the blocks for notes integral to the tonic scale triad receive a staining of green while the upper smaller rectangles of the blocks for notes not integral to the tonic scale triad receive a staining of white, the complementary visual scheme is useful in practicing scales in different tonalities.

20. A method of installing adhesive labels printed thereon a visual scheme onto an instrument, comprising:
printing the visual scheme on adhesive labels in the form of a foldable carton;
folding the foldable carton;
separating from the folded carton a unit suitable to be installed to a space between two metal filaments on the instrument, but in folded size;
introducing the unit into the space underneath strings while adhesive still attached to an adhesive substrate;
rotating sides to detach the adhesive substrate;
repositioning and aligning the unit of adhesive labels underneath the strings; and
attaching the adhesive labels on instrument arm in the space.

* * * * *